United States Patent
Takenaka

(10) Patent No.: US 8,267,213 B2
(45) Date of Patent: Sep. 18, 2012

(54) OMNIDIRECTIONAL VEHICLE

(75) Inventor: Toru Takenaka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 122 days.

(21) Appl. No.: 12/882,688

(22) Filed: Sep. 15, 2010

(65) Prior Publication Data

US 2011/0067940 A1   Mar. 24, 2011

(30) Foreign Application Priority Data

Sep. 18, 2009   (JP) .................................. 2009-217791

(51) Int. Cl.
*B62M 13/00* (2010.01)
(52) U.S. Cl. ........................................ 180/222; 301/5.23
(58) Field of Classification Search .................. 180/205, 180/10, 20, 7.1, 21, 221, 222, 228; 301/5.1, 301/5.23
See application file for complete search history.

(56) References Cited

U.S. PATENT DOCUMENTS

| D309,254 S | * | 7/1990 | Guile .............................. D8/375 |
| 5,213,176 A | * | 5/1993 | Oroku et al. ................... 180/168 |
| 7,318,628 B2 | * | 1/2008 | Guile ........................... 301/5.23 |
| 2010/0096905 A1 | * | 4/2010 | Takenaka et al. ............ 301/5.23 |
| 2011/0209932 A1 | * | 9/2011 | Takenaka et al. ............... 180/15 |

FOREIGN PATENT DOCUMENTS

JP   2004-344435 A   12/2004

* cited by examiner

*Primary Examiner* — Tashiana Adams
(74) *Attorney, Agent, or Firm* — Carrier Blackman & Associates, P.C.; William D. Blackman; Joseph P. Carrier

(57) ABSTRACT

An inverted pendulum type omnidirectional vehicle includes: a pair of wheels; a drive mechanism; a control apparatus; an auxiliary wheel; and a vehicle body. Each of the wheels includes: a rotation member capable of rotating about the wheel axis; a plurality of free rollers which are disposed all around an outer circumference of the rotation member, and each of which is brought into contact with a road surface at a lowest position of the rotation member and is rotatable about a rotation axis diagonal with respect to the wheel axis. The free rollers on both sides in contact with the road surface at ground contact portions each have the rotation axis extending in parallel with the road surface, and are arranged in an orientation in which a distance between the rotation axes of the free rollers is shorter toward a side of the auxiliary wheel.

11 Claims, 4 Drawing Sheets

OMNIDIRECTIONAL VEHICLE

BACKGROUND OF THE INVENTION

1. Field of the Invention

The present invention relates to an inverted pendulum type omnidirectional vehicle.

Priority is claimed on Japanese Patent Application No. 2009-217791, filed on Sep. 18, 2009, the contents of which are incorporated herein by reference.

2. Description of the Related Art

Conventionally, omnidirectional type carts such as described in, for example, Japanese Unexamined Patent Application, First Publication No. 2004-344435 have been proposed. Specifically, this cart includes: four wheels, each made of a Mecanum wheel; drive mechanisms that rotate each of the wheels about a wheel shaft thereof; a control apparatus that controls the drive mechanisms; and a vehicle body to which a plurality of wheels are attached and which receives the load of a passenger. The wheels (Mecanum wheels) each include: a rotation member that is disposed substantially vertical to a road surface and that is rotatable about a wheel shaft; and a plurality of free rollers that are evenly disposed around the outer circumference of the rotation member. The plurality of free rollers are rotatable about an axis (an axis of rotation) which intersects that of the wheel shaft at 45 degree angle. Each of them is brought into contact with the road surface when it is moved to the lowest end of the rotation member with the rotation of the rotation member. The drive mechanisms are made of motors, each of which is provided on the wheel shaft of each wheel. The control apparatus independently controls the rotation angles of the motors based on a detection result from a sensor that detects an external force acting on the vehicle body. According to a cart with the above structure, through control of the rotation angles of the motors by the control apparatus, the cart can be moved in a desired direction at a desired speed.

On the other hand, there is conventionally offered an inverted pendulum type vehicle that is steerable through an instinctive operation by a passenger shifting his or her weight. This vehicle includes: a pair of wheels disposed in parallel in the left-right direction; a drive mechanism that independently rotates the pair of wheels; a control apparatus that controls the drive mechanism; and a vehicle body to which the pair of wheel are attached. According to the vehicle, through control of the drive mechanism by the control apparatus according to the weight shift of the passenger on the vehicle, the pair of wheels are independently rotated, to thereby perform a forward-rearward movement, a change of direction, and an adjustment of speed.

In recent years, an inverted pendulum type omnidirectional vehicle in which the above-mentioned inverted pendulum type vehicle is combined with the above-mentioned Mecanum wheels has been under development.

However, if the aforementioned Mecanum wheels are used as wheels of an inverted pendulum type vehicle, there is a possibility that the direction of movement changes when a wheel on one side spins while traveling due to a rough road surface, leading to a problem with steering stability and ride quality while traveling. Especially, in the case of a vehicle in which an auxiliary wheel is disposed rearwardly of a pair of wheels, and free rollers provided on the wheels on both sides are arranged in the orientations such that the distance between the axes of rotation of the free rollers is gradually wider, when the free rollers are brought into contact with the ground, toward the auxiliary wheel (toward the rearward direction), a vertical distance from the ground contact point of the auxiliary wheel to an extension line of each axis of rotation (axis of rotation of each free roller in contact with the road surface) is long. Therefore, when the wheel on a first side spins while traveling, the moment acting on the wheel on a second side is large, making it likely to cause the vehicle to turn around with the auxiliary wheel as a pivot.

Furthermore, in the case where the free rollers on the wheels on both sides are arranged in the orientations described above, a lateral force with a vector diagonally forward on a first side acts only on the wheel on a second side if the wheel on the first side spins while moving forward, thus causing the vehicle to turn around on the first side. At this time, a load on the wheel on the first side (a spinning side) is reduced by the centrifugal force. This makes it difficult for the wheel on the first side to be restored from the spinning state.

In view of the aforementioned conventional problems, the present invention has an object to provide an inverted pendulum type omnidirectional vehicle capable of achieving high steering stability and excellent ride quality.

SUMMARY OF THE INVENTION

An omnidirectional vehicle according to an embodiment of the present invention is an inverted pendulum type omnidirectional vehicle, including: a pair of wheels disposed in parallel; a drive mechanism that individually rotates the pair of wheels about wheel axes; a control device that controls the drive mechanism; an auxiliary wheel that is disposed at a position spaced from the wheels in a direction orthogonal to the wheel axes; and a vehicle body to which the pair of wheels are attached and which receives a payload, wherein each of the wheels includes: a rotation member capable of rotating about the wheel axis; a plurality of free rollers which are disposed around an outer circumference of the rotation member, and each of which is brought into contact with a road surface at a lowest position of the rotation member and is rotatable about a rotation axis diagonal with respect to the wheel axis, and wherein the free rollers on both sides in contact with the road surface at ground contact portions each have the rotation axis extending in parallel with the road surface, and are arranged in an orientation in which a distance between the rotation axes is shorter toward a side of the auxiliary wheel.

According to this omnidirectional vehicle, a vertical distance from a ground contact point of the auxiliary wheel to an extension line of the rotation axes of the free rollers in contact with the road surface is short. Therefore, when the wheel on a first side spins during traveling, the moment acting on the wheel on a second side becomes small, making it unlikely to produce a turning-around movement with the auxiliary wheel as a pivot. Furthermore, when the wheel on the first side spins in traveling in the direction of the pair of wheels seen from the auxiliary wheel, only the vector on a second side in diagonally forward direction in the wheel on the second side acts. As a result, the vehicle turns around in the second side direction. At this time, a load on the wheel on the first side (the spinning side) increases due to centrifugal force. This facilitates the wheel on the first side to be restored from the spinning state.

Therefore, according to the omnidirectional vehicle according to an embodiment of the present invention, even if a first wheel spins, the vehicle is unlikely to turn around. In addition, the spinning first wheel is likely to be restored to the ground contact position. Consequently, it is possible to achieve high steering stability and excellent ride quality.

DETAILED DESCRIPTION OF THE INVENTION

Hereunder is a description of an embodiment of an omnidirectional vehicle according to the present invention based on the drawings.

First, a structure of the omnidirectional vehicle in the present embodiment will be described.

Figure 1:
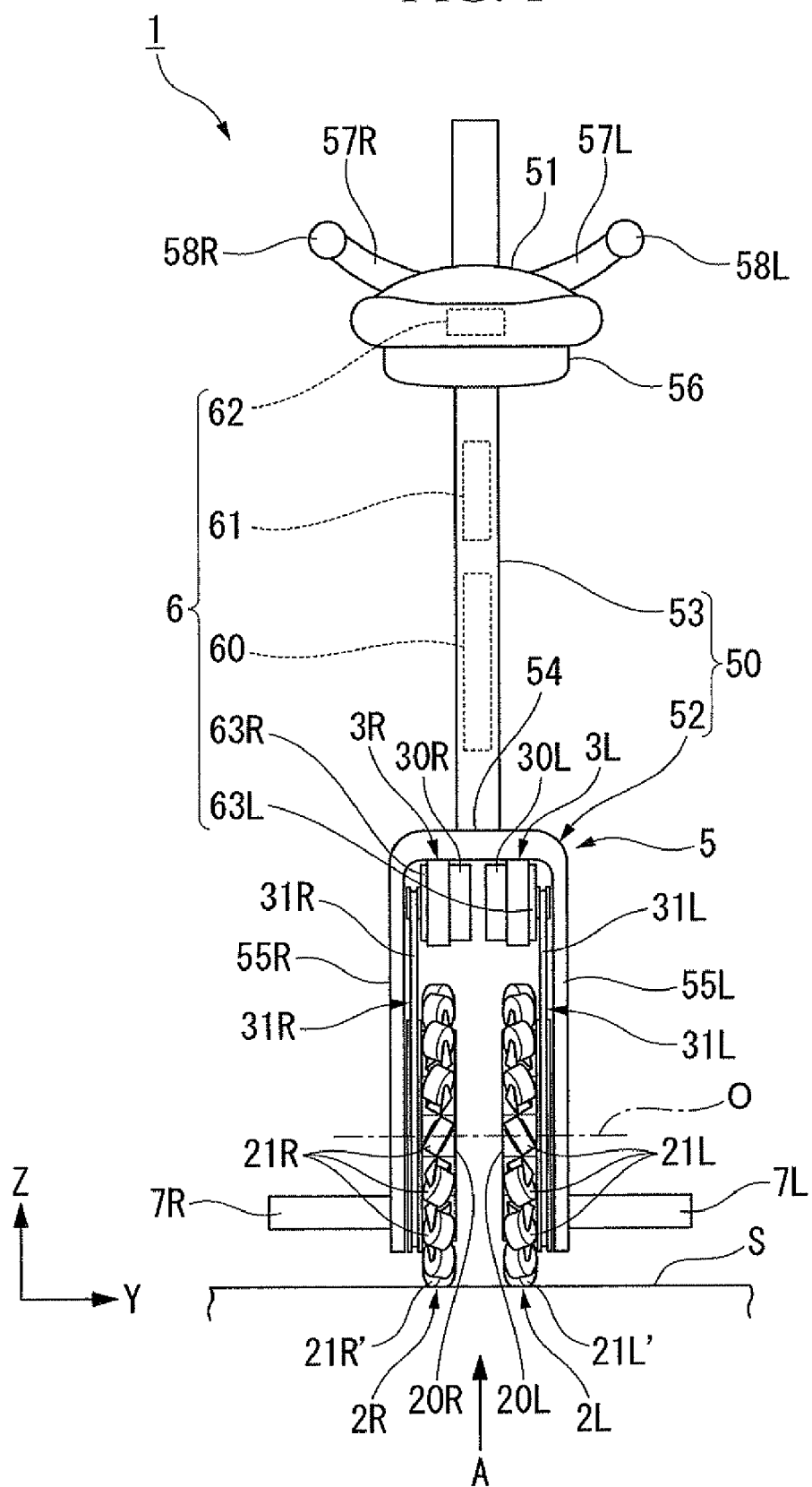
FIG. 1 is a front elevational view showing an omnidirectional vehicle according to an embodiment of the present invention.
Figure 2:
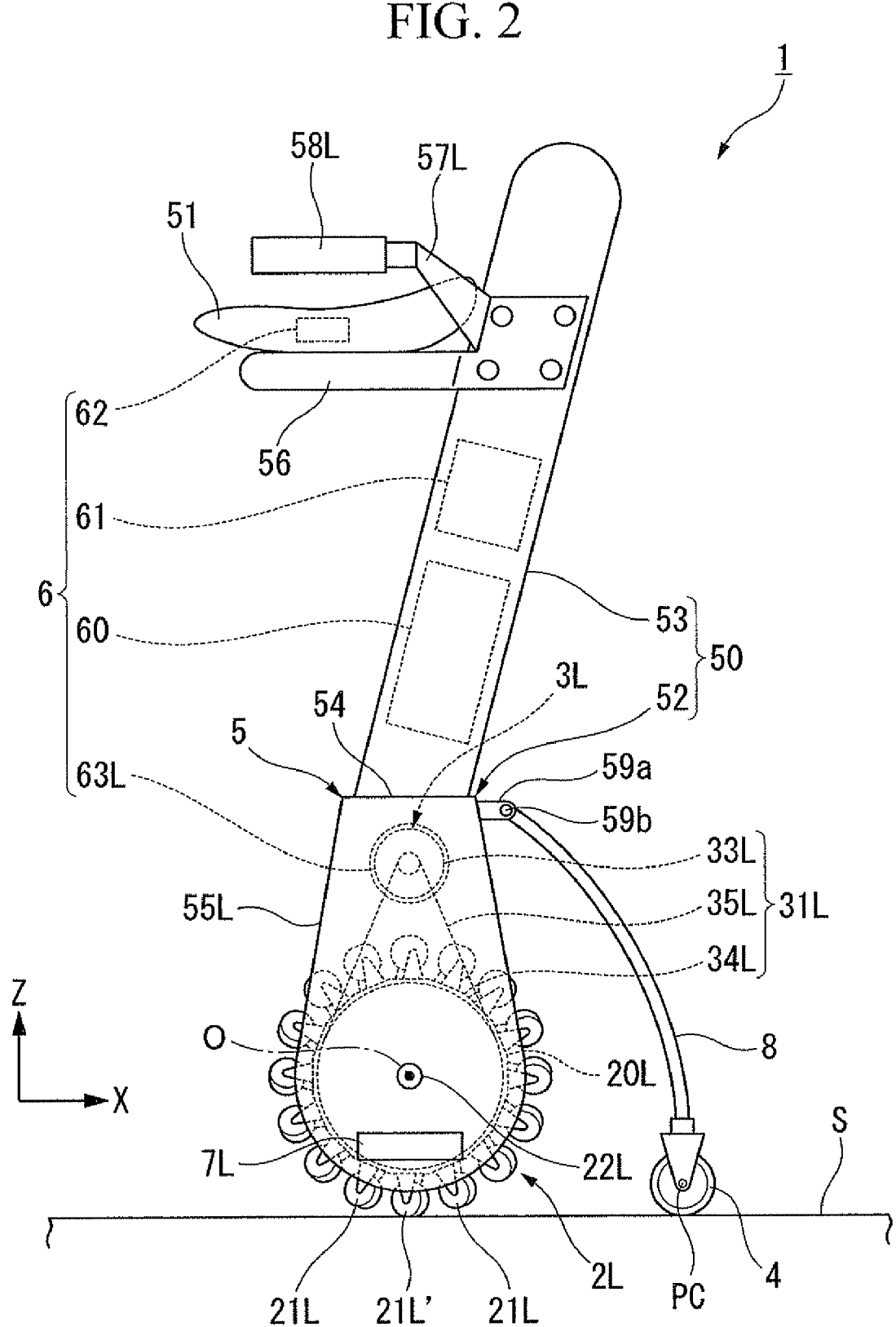
FIG. 2 is a side view showing the omnidirectional vehicle.

As shown in FIG. 1 and FIG. 2, the omnidirectional vehicle in the present embodiment (hereinafter, referred to simply as "vehicle 1") is a vehicle movable on a road surface S in all directions (two-dimensional all directions including the forward-rearward direction and the left-right direction). The vehicle 1 is an inverted pendulum type electromotive vehicle that, when a passenger seated on the vehicle 1 makes a weight shift to a desired degree in a desired direction, travels toward the direction of the weight shift at a speed in proportional to the degree of the weight shift. As a schematic structure, the vehicle 1 includes: a pair of wheels 2R, 2L disposed in parallel; drive mechanisms 3R, 3L that impart power for driving the pair of wheels 2R, 2L respectively to the wheels 2R, 2L, to thereby independently rotate the pair of wheels 2R, 2L about a wheel axis O; an auxiliary wheel 4 that is disposed rearwardly of the pair of wheels 2R, 2L; a vehicle body 5 to which the pair of wheels 2R, 2L are attached and which also receives a load of a passenger (corresponding to a payload); and a control apparatus 6 that controls the drive mechanisms 3R, 3L.

Here, in the description of the present embodiment, the "left-right direction" and the "forward-rearward direction" refer to the directions that coincide or substantially coincide respectively with the left-right direction and the forward-rearward direction of an upper body of a passenger who is seated on the vehicle body 5 in a standard posture. The "standard posture" is a posture that is intended by design with respect to the vehicle body 5. It is a posture of the passenger in which a trunk axis of his or her upper body is directed substantially in the up-down direction without his or her upper body being twisted. That is, the lateral direction (the Y axis) in FIG. 1 is the "left-right direction" of the vehicle 1. The left side in FIG. 1 is the "right side" of the vehicle 1. The right side in FIG. 1 is the "left side" of the vehicle 1. Furthermore, the lateral direction (the X axis) in FIG. 2 is the "forward-rearward direction" of the vehicle 1. The left side in FIG. 2 is the "forward side" of the vehicle 1. The right side in FIG. 2 is the "rearward side" of the vehicle 1. Furthermore, the longitudinal direction (the Z axis) in FIG. 1 and FIG. 2 is the "vertical direction" of the vehicle 1. The upper side in FIG. 1 and FIG. 2 is the "up direction" of the vehicle 1. The lower side in FIG. 1 and FIG. 2 is the "down direction" of the vehicle 1. Furthermore, in the description of the present embodiment, the letters "R" and "L" added to a reference symbol are intended to be used to indicate that the element denoted by the reference symbol corresponds respectively to one on the right side and one on the left side of the vehicle 1. Furthermore, the "road surface S" is a surface of a road on which the vehicle 1 travels. It includes not only an outdoor road surface but also an indoor road surface such as a floor surface in a building.

The vehicle body 5 includes: a frame 50 which is a framework member made of metal; and a saddle 51 attached to the frame 50.

As a schematic structure, the frame 50 includes: a base 52 to which the pair of wheels 2R, 2L, the drive mechanisms 3R, 3L, and the auxiliary wheel 4 are assembled; and a support post 53 that is erected from the base 52 toward the upward direction. The base 52 is a support portion that supports the pair of wheels 2R, 2L, the drive mechanisms 3R, 3L, and the auxiliary wheel 4, and is also an exterior body (a cover) that covers the wheels 2R, 2L and the drive mechanisms 3R, 3L. The base 52 is formed in a substantially inverted U-shape when seen in a longitudinal cross-section. Specifically, the base 52 includes: a top panel portion 54 that covers the wheels 2R, 2L from above; and a pair of side panel portions 55R, 55L that droop respectively from the end portions on the left and right sides of the top panel portion 54 to cover the wheels 2R, 2L from the left and right sides. The support post 53 is a rectangular cylindrical member that is erected on a top surface of the top panel portion 54. The support post 53 is inclined toward the rearward side as it extends toward the upward direction. Furthermore, on exterior surface portions of the side panel portions 55R, 55L, steps 7R, 7L on which the feet of the passenger are to be placed are protrudingly provided so as to extend to the right direction and the left direction, respectively.

On the upper portion of the support post 53, there is fixed a saddle bracket 56 that extends toward the forward side. On top of the saddle bracket 56, the saddle 51 is placed. The saddle 51 is a seat portion on which the passenger is to be seated, and is also a load receiving portion that receives a load of the passenger. That is, the vehicle 1 in the present embodiment moves on the road surface S while the passenger is in a posture of being seated on the saddle 51.

Furthermore, on the upper portion of the support post 53, there are fixed grip bars 57R, 57L that extend toward the forward side from the support post 53 and are disposed respectively on the right side and the left side of the saddle 51. At front ends of the grip bars 57R, 57L on both sides, there are provided grips 58R, 58L, respectively.

Figure 3:
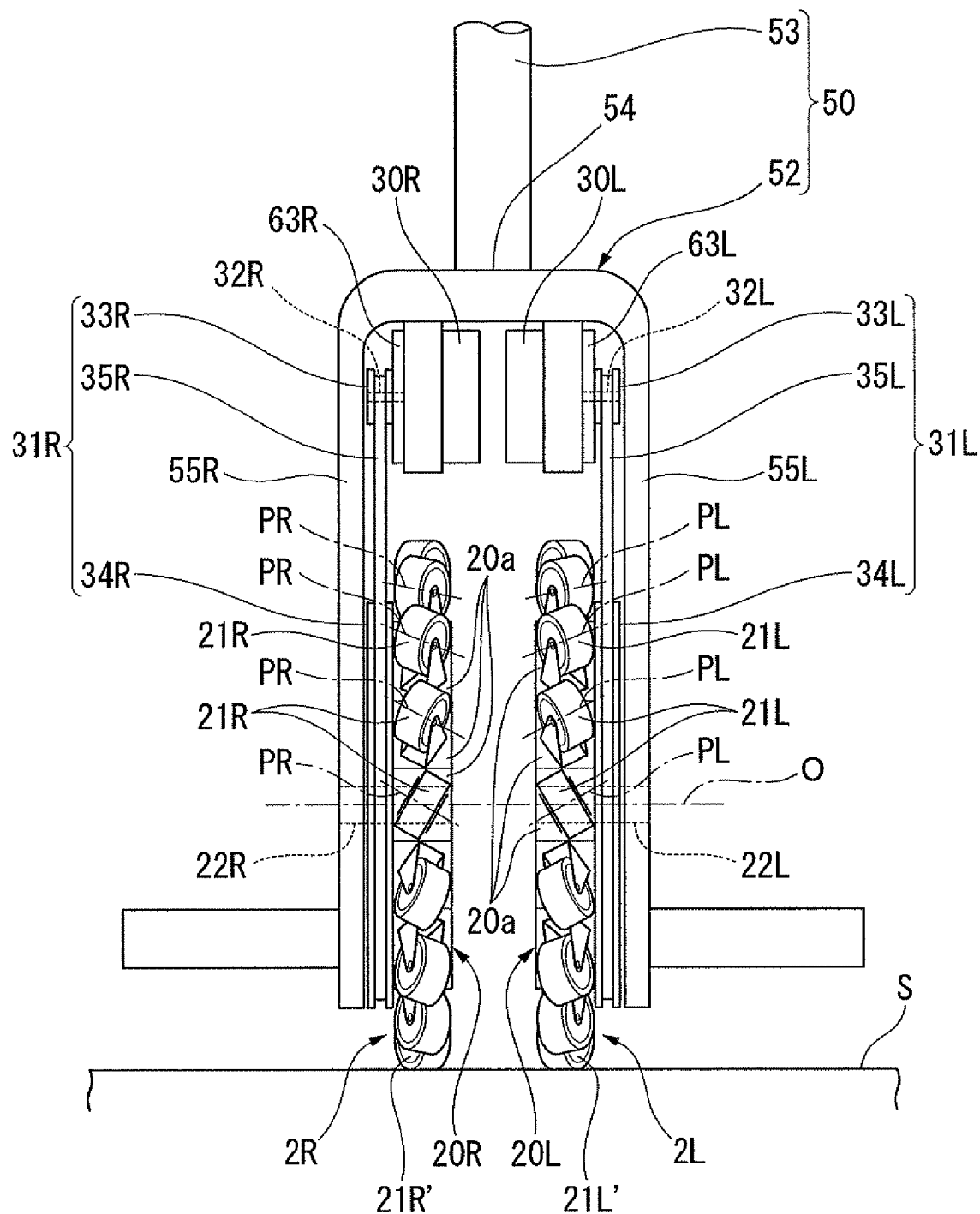
FIG. 3 is a front elevational view showing an enlarged lower portion of the omnidirectional vehicle.

The pair of wheels 2R, 2L are arranged inside of the base 52 (between the pair of side panel portions 55R, 55L). The pair of wheels 2R, 2L are arranged in an opposed manner in the left-right direction, and their wheel axes extend on the same line as the wheel axis O. Specifically, as shown in FIG. 3, the wheels 2R, 2L respectively include: rotary bodies 20R, 20L that are disposed substantially vertical to the road surface S; and a plurality of free rollers 21R, 21L that are arranged evenly around outer circumferences of the rotary bodies 20R, 20L.

Each of the rotary bodies 20R, 20L is a regular-polygonal wheel main body with a plurality of flat portions 20a formed on its outer circumferential surface. The flat portions 20a are connected in an annular shape about the wheel axis O. The rotary bodies 20R, 20L are arranged in parallel with the inner surfaces of the side panel portions 55R, 55L. At the central portions of the rotary bodies 20R, 20L, shaft members 22R, 22L are respectively provided whose central axis lines extend as the wheel axis O. The rotary bodies 20R, 20L are rotatably supported by the side panel portions 55R, 55L via the shaft members 22R, 22L, and hence are rotatable about the wheel axis O. The plurality of flat portions 20a are each formed vertical to the radial direction of the rotary bodies 20R, 20L (the direction orthogonal to the wheel axis O).

The free rollers 21R, 21L are cylindrical bodies that are rotatable about rotation axes PR, PL, and are disposed on the flat portions 20a of the rotary bodies 20R, 20L on one-on-one basis. Each of the free rollers 21R, 21L are brought into contact with the road surface S when it has been moved to the lowest ends of the rotary bodies 20R, 20L with the rotation of the rotary bodies 20R, 20L. Via free rollers 21R', 21L' at the lowest positions of the rotary bodies 20R, 20L, the vehicle 1 is supported on the road surface S.

Figure 4:
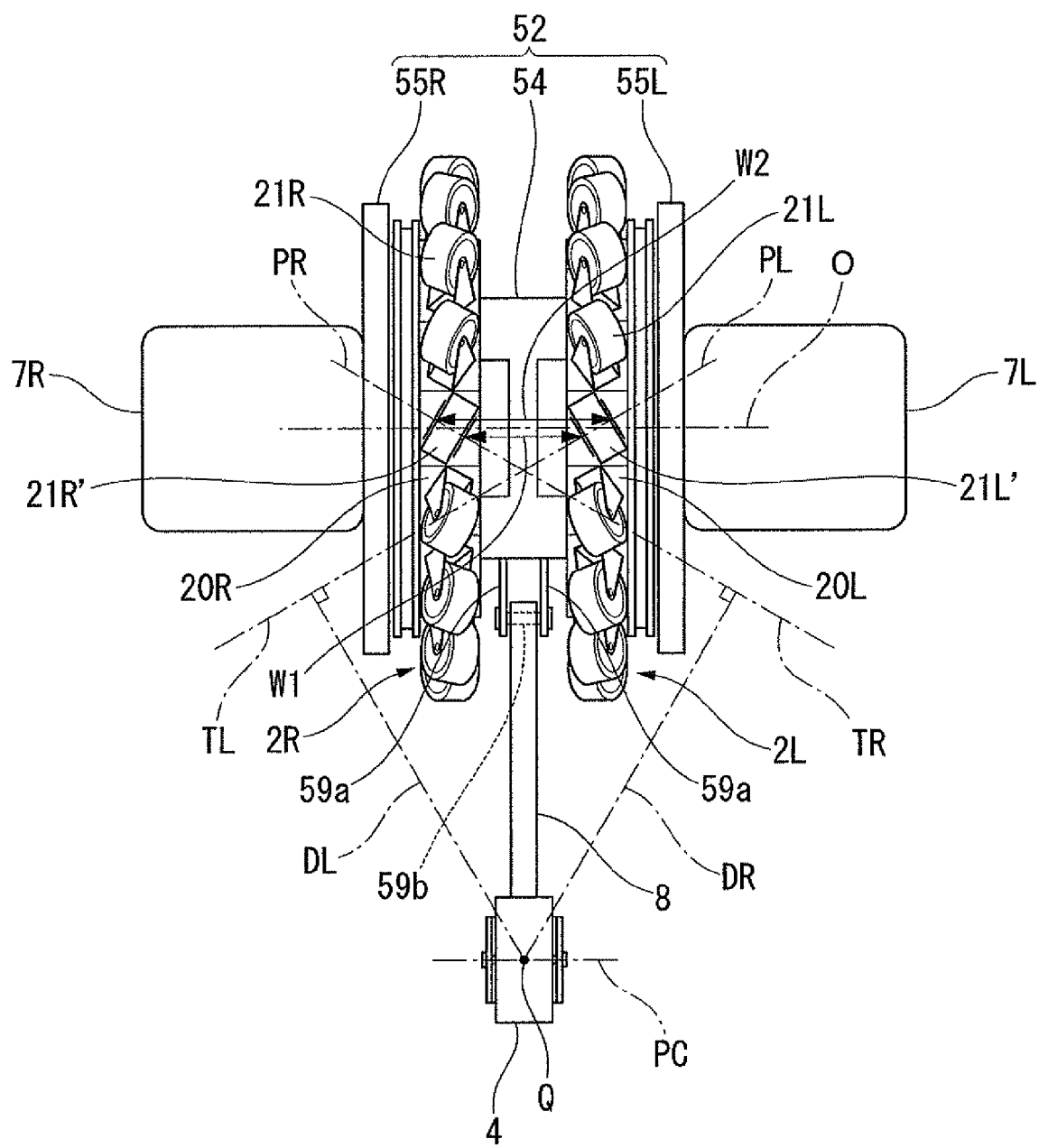
FIG. 4 is a view of the omnidirectional vehicle shown in FIG. 1, seen in the direction of the arrow A.

The free rollers 21R, 21L are protrudingly provided along the radial directions of the rotary bodies 20R, 20L, as shown in FIG. 2. Furthermore, the free rollers 21R, 21L are disposed diagonally to the axis direction of the rotary bodies 20R, 20L, as shown in FIG. 3. That is, the rotation axes PR, PL of the free rollers 21R, 21L extend in parallel with their respective flat portions 20a, and are also inclined with respect to the wheel axis O. Specifically, as shown in FIG. 4, when placed at the ground contact portions in contact with the road surface S (the lowest positions of the rotary bodies 20R, 20L) shown in FIG. 1, the free rollers 21R, 21L on both sides are arranged in orientations in which their rotation axes PR, PL extend in parallel with the road surface S and also in which a distance between the rotation axes PR, PL (a distance denoted by W1, W2 in FIG. 4) are gradually shorter toward the auxiliary wheel 4 side (the rearward side). That is, the free rollers 21R, 21L are attached so that the angle directions of their rotation axes PR, PL at their ground contact portions are between a direction opposite to the direction in which the auxiliary wheel 4 is provided with respect to the wheel axis O and the wheel axis O. Of the plurality of free rollers 21R, 21L, the free rollers 21R', 21L' in contact with the road surface S at the ground contact portions have their rotation axes PR, PL inclined, when seen in a planar view, toward the auxiliary wheel 4 side (the rearward side) from the outer side to the inner side in the left-right direction. In other words, the plurality of free rollers 21R, 21L are respectively attached to the rotary bodies 20R, 20L so that, for example in the case where the wheels 2R, 2L (the rotary bodies 20R, 20L) are rotated in the advancing direction, lateral forces acting respectively on the free rollers 21R, 21L in contact with the road surface S are directed outwardly. That is, the lateral force on the free roller 21R on the right side is directed to the right direction, and the lateral force on the free roller 21L on the left side is directed to the left side.

The drive mechanisms 3R, 3L respectively include: power sources 30R, 30L; and power transmission members 31R, 31L that transmit powers output by the power sources 30R, 30L to the wheels 2R, 2L.

The power sources 30R, 30L are electric motors that output a torque, which are disposed inside the base 52. Specifically, the power sources 30R, 30L are arranged above the wheels 2R, 2L and fixed on the bottom surface of the top panel portion 54 of the base 52.

The power transmission members 31R, 31L are mechanisms that connect the output shafts 32R, 32L of the power sources 30R, 30L with the shaft members 22R, 22L of the wheels 2R, 2L, to thereby transmit the torques of the output shafts 32R, 32L to the shaft members 22R, 22L. Hence, the power transmission members 31R, 31L include a function of a decelerator. To be more specific, the power transmission members 31R, 31L respectively include: small-diameter drive pulleys 33R, 33L mounted on the output shafts 32R, 32L; large-diameter follower pulleys 34R, 34L mounted on the shaft members 22R, 22L of the wheels 2R, 2L; and belts 35R, 35L wound around the drive pulleys 33R, 33L and the follower pulleys 34R, 34L. The follower pulleys 34R, 34L are arranged between the side panel portions 55R, 55L of the base 52 and the rotary bodies 20R, 20L of the wheels 2R, 2L. Above the follower pulleys 34R, 34L, the drive pulleys 33R, 33L are disposed. It is possible to integrate at least two of the follower pulleys 34R, 34L, the rotary bodies 20R, 20L, and the shaft members 22R, 22L.

As shown in FIG. 2 and FIG. 4, the auxiliary wheel 4 is a rotatable free roller that is disposed at a spaced position on the rearward side of the wheels 2R, 2L. The auxiliary wheel 4 is fixed at a front end (a lower end) of an arm 8 coupled to the base 52, and is also in contact with the road surface S. The auxiliary wheel 4 is disposed posterior to the middle point of the wheels 2R, 2L on both sides, and is arranged at a position at the same distance from the ground contact positions of the wheels 2R, 2L on both sides. Furthermore, a rotation axis PC of the auxiliary wheel 4 extends in the left-right direction along the road surface S, that is, in parallel with the wheel axis O. That is, the auxiliary wheel 4 is rotatable along a vertical surface that extends in the forward-rearward direction.

The arm 8 is a curved rod-like member, which is disposed posterior to the base 52. An upper end of the arm 8 is rotatably coupled to a rear surface (a back surface) of the top panel portion 54 of the base 52. Specifically, on the rear surface of the top panel portion 54 of the base 52, a pair of brackets 59a, 59a are protrudingly provided that are arranged in parallel in the left-right direction. Between the pair of brackets 59a, 59a, there is stretched a pivot shaft 59b that extends in the left-right direction. On the pivot shaft 59b, the upper end of the arm 8 is pivotally supported. Furthermore, between the pair of brackets 59a, 59a, a biasing member (not shown in the figure) is provided that rotatingly biases the arm 8 about the pivot shaft 59b. The biasing member is made of, for example, a twisted coil spring and biases the arm 8 downward. This brings the auxiliary wheel 4 provided on the lower end of the arm 8 into contact with the road surface S with a predetermined ground contact load. Furthermore, through operation on a lever or the like (not shown in the figure), it is possible to rotate the arm 8 upward while resisting the biasing force from the biasing member (not shown in the figure). As a result, the auxiliary wheel 4 is moved up and down between a position in contact with the road surface S and a position spaced from the road surface S.

As shown in FIG. 1 and FIG. 2, the control apparatus 6 control the drive mechanisms 3R, 3L in accordance with the posture of the vehicle body 5, to thereby cause the vehicle 1 to travel in an optional direction at an optional speed. Specifically, the control apparatus 6 includes: a control unit 60 made of an electronic circuit unit that includes a microcomputer and a drive circuit unit for the power sources 30R, 30L; an inclination sensor 61 for measuring an inclination angle with respect to the vertical direction (the direction of gravitation) of a predetermined site of the vehicle body 5 and for measuring its change speed; a load sensor 62 for detecting whether a passenger is seated on the vehicle 1 or not; and rotary encoders 63R, 63L as angle sensors for respectively detecting rotation angles and rotation angular speeds of the output shafts 32R, 32L of the power sources 30R, 30L.

The control unit 60 and the inclination sensor 61 attached to the support post 53 in a state of, for example, being contained inside the support post 53 of the vehicle body 5. The load sensor 62 is built into the saddle 51. The rotary encoders 63R, 63L are provided integrally with the power sources 30R, 30L, respectively. The rotary encoders 63R, 63L may be attached to the rotary bodies 20R, 20L, respectively.

The inclination sensor 61 more particularly includes: an acceleration sensor; and a rate sensor (an angular speed sensor) such as a gyrosensor. The inclination sensor outputs detection signals from these sensors to the control unit 60.

The control unit 60, in turn, executes predetermined measurement arithmetic processing (known arithmetic processing) based on the outputs from the acceleration sensor and the rate sensor of the inclination sensor 61. Thereby, a "measurement value for the inclination angle with respect to the vertical direction" for the site at which the inclination sensor 61 is mounted (the support post 53) and a "measurement value for inclination angular speed" as its change speed (its differential value) are computed.

The load sensor 62 is built into the saddle 51 in order to receive a load by the weight of a passenger when the passenger is seated on the saddle 51. The load sensor 62 outputs a detection signal in accordance with the load to the control unit 60. The control unit 60, in turn, determines whether a passenger is mounted on the vehicle 1 or not based on the measurement value for the load indicated by the output from the load sensor 62.

Instead of the load sensor 62, for example a switch-type sensor that will be turned ON when a passenger is seated on the saddle 51 may be used.

The rotary encoders 63R, 63L each generate a pulse signal every time the corresponding output shafts 32R, 32L of the power sources 30R, 30L are rotated by a predetermined angle, and output the pulse signal to the control unit 60. Based on the pulse signals, the control unit 60, in turn, measures rotation angles of the corresponding output shafts 32R, 32L of the power sources 30R, 30L, and furthermore measures ratio of change over time (differential values) in the measurement values for the rotation angles as rotation angular speeds of the power sources 30R, 30L.

The control unit 60 uses the above-mentioned measurement values to execute predetermined arithmetic processing, to thereby determine speed commands as target values for the respective rotation angular speeds of the power sources 30R, 30L. Then, in accordance with the speed commands, the control unit 60 feedback-controls the respective rotation angular speeds of the power sources 30R, 30L.

The relationship between the rotation angular speeds of the output shafts 32R, 32L of the power sources 30R, 30L and the rotation angular speeds of the rotary bodies 20R, 20L that respectively correspond to the power sources 30R, 30L is a proportional relationship between the output shafts 32R, 32L and the rotary bodies 20R, 20L in accordance with a deceleration ratio with a given value. Therefore, in the description of the present embodiment, the rotation angular speeds of the power sources 30R, 30L are assumed to refer to the rotation angular speeds of the rotary bodies 20R, 20L, for convenience' sake.

Next is a description of an operation of the omnidirectional vehicle 1 with the above structure.

First, the vehicle 1 uses the load sensor 62 to detect whether a passenger is seated on the vehicle 1 or not, and transmits the result to the control unit 60. Here, when a passenger is seated on the vehicle 1, the control unit 60 is put in self-supporting mode and controls the power sources 30R, 30L so that the vehicle 1 is self-supported and stationary. That is, if the vehicle 1 is inclined, the inclination sensor 61 detects its inclination direction and its inclination angle. On receiving the detection result, the control unit 60 controls the power sources 30R, 30L to appropriately rotate the wheels 2R, 2L so that the vehicle 1 is in a self-supported posture. Specifically, the target posture is a posture of the vehicle body 5 in a state where a point of the center of gravity of the vehicle 1 as a single unit is located substantially directly above the middle point of the pair of the wheels 2R, 2L (the middle point of the wheel axis O), that is, a state where the point of the center of gravity is located substantially directly above the middle position of the ground contact points of the free rollers 21R, 21L on both sides that are in contact with the road surface S. The control unit 60 controls the rotation operations of the wheels 2R, 2L so that the actual posture of the vehicle body 5 is brought to the target posture and so that the vehicle 1 becomes self-supporting without the vehicle body 5 being inclined to fall down. As a result, the vehicle 1 is stationary in a self-supporting posture.

On the other hand, when a passenger is seated on the saddle 51, the load sensor 62 detects that there is a passenger. On receiving the detection result, the control unit 60 is put into traveling mode and controls the power sources 30R, 30L in accordance with the inclination of the vehicle body 5 to cause the vehicle 1 to travel. That is, in the case where the passenger seated on the saddle 51 inclines his or her upper body, that is, in the case where the passenger inclines his or her upper body so as to move a position of a point of the center of gravity (a position that is projected on a horizontal plane) of a whole entity in which the passenger and the vehicle 1 are combined, the vehicle body 5 is basically inclined to the side to which the upper body is inclined. At this time, the control apparatus 6 controls the power sources 30R, 30L to control the rotation operations of the wheels 2R, 2L so that the vehicle 1 moves to the side to which the vehicle body 5 has been inclined.

Specifically, in the vehicle 1 of the present embodiment, a total area of the ground contact surfaces of the wheels 2R, 2L (the free rollers 21R, 21L) as a ground contact surface of the whole of the vehicle 1 is a local region smaller than a region on the floor on which the whole of the vehicle 1 and the passenger mounted thereon is projected. Hence, a floor reaction force acts only on the local region. Therefore, to prevent the vehicle body 5 from inclining to fall down, it is required to move the wheels 2R, 2L so that the point of the center of gravity of the whole of the passenger and the vehicle 1 is located substantially directly above the middle position of the ground contact surfaces of the pair of wheels 2R, 2L (the free rollers 21R, 21L).

Therefore, in the present embodiment, the rotation operations of the wheels 2R, 2L are basically controlled so that with a posture of the vehicle body 5 in a state where the point of center of gravity of the whole of the passenger and the vehicle 1 is located substantially directly above the middle point of the ground contact surfaces of the pair of wheels 2R, 2L being regarded as a target posture, an actual posture of the vehicle body 5 is brought to the target posture.

For example, if a user inclines his or her upper body forwardly or rearwardly to incline the vehicle body 5 in the forward-rearward direction, the inclination sensor 61 detects an inclination direction and an inclination angle of the vehicle body 5. Based on the detection result, the control unit 60 controls the power sources 30R, 30L so as to rotate the pair of rotary bodies 20R, 20L in the same direction at a constant speed. When the pair of rotary bodies 20R, 20L are rotated in the same direction at a constant speed, the free rollers 21R, 21L of the rotary bodies 20R, 20L on both sides are sequentially brought into contact with the road surface S with the rotation operations of the rotary bodies 20R, 20L. At this time, on the free rollers 21R, 21L on both sides in contact with the road surface S at the ground contact portions, a lateral force (a friction force) in the direction opposite to the rotation direction of the rotary bodies 20R, 20L acts against the road surface S. However, the vectors in the directions orthogonal to the rotation axes PR, PL are cancelled by the free rollers 21R, 21L rotating about the rotation axes PR, PL. Therefore, on the free rollers 21R, 21L at the ground contact portions, only vectors in the directions along the rotation axes PR, PL act. At this time, because the free rollers 21R, 21L on both sides at the ground contact portions are arranged in the orientations in which a distance between their respective rotation axes PR, PL is gradually shorter toward the auxiliary wheel 4 side (the rearward side), the vectors on both sides that act respectively on the free rollers 21R, 21L on both sides at the ground contact portions are directed in the diagonally forward side or the diagonally rearward side to be symmetrical about the centerline extending in the forward-rearward direction. As a result, the above-mentioned vectors on both sides have their component in the left-right direction cancelled and also have their component in the forward-rearward direction added, to thereby move the whole of the vehicle 1 in the forward or rearward direction.

On the other hand, when the passenger inclines his or her upper body to the left or to the right to incline the vehicle body 5 in the left-right direction in a state where the arm 8 is raised to cause the auxiliary wheel 4 to be spaced from the road surface S, the inclination sensor 61 detects the inclination direction and the inclination angle of the vehicle body 5. Based on the detection result, the control unit 60 controls the power sources 30R, 30L so as to rotate the pair of rotary bodies 20R, 20L in the opposite directions at a constant speed. When the pair of rotary bodies 20R, 20L in the opposite directions at a constant speed are rotated, the free rollers 21R, 21L of the rotary bodies 20R, 20L on both sides are sequentially brought into contact with the road surface S in directions opposite to each other, with the rotation operations of the rotary bodies 20R, 20L. At this time, on the free rollers 21R, 21L at the ground contact portions, only the vectors in the directions along the rotation axes PR, PL act. However, of the vectors on both sides that respectively act on the free rollers 21R, 21L on both sides at the ground contact portions, one is directed in the obliquely forward direction, and the other is directed in the obliquely rearward direction. As a result, the vectors on both sides have their component in the forward-rearward direction cancelled, and have their component in the left-right direction added. Thereby, the whole of the vehicle 1 is moved in the left direction or the right direction.

Furthermore, when the passenger inclines his or her upper body diagonally with respect to the left-right direction or the forward-rearward direction to incline the vehicle body 5 in a diagonal direction in a state where the arm 8 is raised to cause the auxiliary wheel 4 to be spaced from the road surface S, the inclination sensor 61 detects the inclination direction and the inclination angle of the vehicle body 5. Based on the detection result, the control unit 60 controls the power sources 30R, 30L so as to rotate the pair of rotary bodies 20R, 20L in the same direction at different speeds, or so as to rotate the pair of rotary bodies 20R, 20L in directions opposite to each other at different speeds, or so as to rotate only one of the pair of rotary bodies 20R, 20L while stopping the other. As a result, with the addition of the vectors acting on the free rollers 21R, 21L on both sides, the whole of the vehicle 1 is moved in a diagonal direction with respect to the forward-rearward direction or the left-right direction.

When the passenger inclines his or her upper body in the left-right direction or a diagonal direction as described above in a state where the arm 8 is lowered to bring the auxiliary wheel 4 into contact with the road surface S, the wheels 2R, 2L try to move in the left-right direction or the diagonal direction. However, the vehicle 1 is restricted in the movement in the left-right direction or the diagonal direction by the auxiliary wheel 4. As a result, the vehicle 1 turns around with the auxiliary wheel 4 as a pivot.

In the vehicle 1 with the above structure, even if, as described above, one wheel 2R (2L) is spaced from the road surface S due to irregularities or the like in the road surface S and spins when the vehicle 1 travels, the turning around of the vehicle 1 by the spinning of the one wheel is suppressed so as to be small, and also the spinning state is readily restored to the normal state. That is, as shown in FIG. 4, in the vehicle 1, the free rollers 21R, 21L on both sides in contact with the road surface S at the ground contact portions are arranged in the orientations in which the distance between their rotation axes PR, PL is gradually shorter toward the auxiliary wheel 4 side (the rearward side). Therefore, vertical distances DR, DL from a ground contact point Q of the auxiliary wheel 4 to extension lines TR, TL of the rotation axes PR, PL are shorter. As a result, when the wheel 2R (2L) on one side spins while traveling, the moment acting on the wheel 2L (2R) on the other side becomes small, making it unlikely to produce a turning-around movement with the auxiliary wheel 4 as a pivot. Furthermore, when the wheel 2R (2L) on a first side spins in traveling in the direction of the pair of wheel 2R, 2L side seen from the auxiliary wheel 4, that is, in the forward direction, only the vector on a second side in diagonally forward direction in the wheel 2L (2R) on the second side acts, that is, only the vector along the rotation axis PL (PR) of the free roller 21L (21R) on the second side acts. As a result, the vehicle 1 turns around in the second side direction. At this time, a load on the wheel 2R (2L) on the first side (the spinning side) increases due to centrifugal force. This facilitates the wheel 2R (2L) on the first side to be restored from the spinning state.

As described above, according to the vehicle 1, even if a first wheel 2R (2L) spins, the vehicle 1 is unlikely to turn around. In addition, the spinning first wheel 2R (2L) is likely to be restored to the ground contact position. This enables improvement in steering stability in traveling, and also offers excellent ride quality.

While an omnidirectional vehicle according to an embodiment of the present invention has been described, the present invention is not limited to the embodiment, and appropriate modifications can be made without departing from the sprit or scope thereof.

For example, in the above embodiment, the description has been for the vehicle 1 in which the vehicle body 5 is provided with the saddle 51 and which is driven by a passenger in a posture seated on the saddle 51. However, the present invention is not limited to the above-mentioned seated-type vehicle 1. For example, it may be a vehicle in which a vehicle body 5 includes: a step for mounting both legs of a passenger; and a handle to be gripped by the passenger standing on the step, and which is driven by the passenger while standing up.

Furthermore, in the above embodiment, the pulley-belt-type power transmission members 31R, 31L respectively made of the drive pulleys 33R, 33L, the follower pulleys 34R, 34L, and the belts 35R, 35L are provided. However, the present invention may have drive mechanisms that each include another power transmission member. For example, ones made of a sprocket and a link chain, or ones made of a plurality of gears may be used. Furthermore, for example, the power sources 30R, 30L and the wheels 2R, 2L may be arranged in the left-right direction so that the output shafts 32R, 32L of the power sources 30R, 30L are coaxial with the shaft members 22R, 22L of the wheels 2R, 2L, and the output shafts 32R, 32L of the power sources 30R, 30L may be coupled to the rotary bodies 20R, 20L respectively via a decelerator (such as a planet gear).

Furthermore, in the above embodiment, the auxiliary wheel 4 is disposed posterior to the pair of wheels 2R, 2L, and the free rollers 21R, 21L on both sides at the ground contact portions are arranged in the orientations in which the distance between the rotation axes PR, PL is gradually shorter toward the rearward side. Instead of this, in the present invention, the auxiliary wheel 4 may be disposed anterior to the pair of wheels 2R, 2L, and the free rollers 21R, 21L on both sides at the ground contact portions may be arranged in orientations in which the distance between the rotation axes PR, PL is gradually shorter toward the forward side.

Furthermore, in the above embodiment, the rotary bodies 20R, 20L are disposed substantially vertical to the road surface S, and are disposed in parallel lines when seen in the forward-rearward direction from the arrow. However, in the present invention, the rotary bodies 20R, 20L may be disposed diagonally with respect to the road surface S. For example, the rotary bodies 20R, 20L on both sides may be disposed in an inverted V-shape when seen in the forward-rearward direction from the arrow. That is, the upper ends of the rotary bodies 20R, 20L of the wheels 2R, 2L on both sides may be inclined to the inner side in the left-right direction, and the distance between the rotary bodies 20R, 20L on both sides may be gradually shorter toward the upper direction. In this case, because the wheel axes O of the pair of wheels 2R, 2L extend vertically to the respective rotary bodies 20R, 20L, the wheel axes O do not extend along the same line, and hence make a V-shape when seen in the forward-rearward direction from the arrow.

Other than this, it is appropriately possible to substitute constituent element(s) in the above embodiment with known constituent element(s) in a range without departing from the spirit or scope of the present invention. Furthermore, the above modifications may be appropriately combined. The present invention is not limited by the aforementioned description, but is limited only by the appended claims.

What is claimed is:

1. An inverted pendulum type omnidirectional vehicle, comprising:
    a pair of wheels disposed in parallel;
    a drive mechanism that individually rotates the pair of wheels about axes of the wheels;
    a control apparatus that controls the drive mechanism;
    an auxiliary wheel that is disposed at a position spaced from the wheels in a direction orthogonal to the wheel axes; and
    a vehicle body to which the pair of wheels are attached and which receives a payload, wherein each of the wheels comprises:
    a rotation member capable of rotating about the wheel axis;
    a plurality of free rollers which are disposed around an outer circumference of the rotation member, and each of which is brought into contact with a road surface at a lowest position of the rotation member and is rotatable about a rotation axis diagonal with respect to the wheel axis, and
    wherein the free rollers on both sides in contact with the road surface at ground contact portions each have the rotation axis extending in parallel with the road surface, and are arranged in an orientation in which a distance between the rotation axes of the free rollers is shorter toward a side of the auxiliary wheel.

2. The inverted pendulum type omnidirectional vehicle of claim 1, wherein each wheel of said pair of wheels is a mecanum wheel.

3. The inverted pendulum type omnidirectional vehicle of claim 1, wherein said vehicle comprises a frame comprising a base which supports said pair of wheels thereon, and a support post attached to, and extending upwardly from the base.

4. The inverted pendulum type omnidirectional vehicle of claim 3, wherein said vehicle further comprises a saddle attached to said frame for supporting a user thereon, and a pair of hand grips attached to said frame and configured to be grasped by a user.

5. The inverted pendulum type omnidirectional vehicle of claim 3, wherein said vehicle further comprises an inclination sensor disposed in said support post.

6. The inverted pendulum type omnidirectional vehicle of claim 4, wherein said vehicle further comprises a pair of opposed steps attached to said base for supporting a user's feet thereon.

7. An inverted pendulum type omnidirectional vehicle, said vehicle comprising:
    a vehicle body comprising a frame comprising a base formed in a substantially inverted U-shape, and a support post attached to and extending upwardly from the base;
    a pair of wheels rotatably attached to the base and disposed in parallel;
    a drive mechanism that is operable to individually rotate each wheel of the pair of wheels about axes of the wheels;
    a control apparatus that controls the drive mechanism;
    an auxiliary wheel that is operatively attached to the base and disposed at a position spaced from the wheels in a direction orthogonal to the wheel axes; and
    wherein each of the wheels comprises:
    a rotation member capable of rotating about the wheel axis; and
    a plurality of free rollers which are disposed around an outer circumference of the rotation member, and each of which is brought into contact with a road surface at a lowest position of the rotation member and is rotatable about a rotation axis diagonal with respect to the wheel axis, and
    wherein the free rollers on both sides in contact with the road surface at ground contact portions each have the rotation axis extending in parallel with the road surface, and are arranged in an orientation in which a distance between the rotation axes of the free rollers is shorter toward a side of the auxiliary wheel.

8. The inverted pendulum type omnidirectional vehicle of claim 7, wherein each wheel of said pair of wheels is a mecanum wheel.

9. The inverted pendulum type omnidirectional vehicle of claim 7, wherein said vehicle further comprises a saddle attached to said frame for supporting a user thereon, and a pair of hand grips attached to said frame and configured to be grasped by a user.

10. The inverted pendulum type omnidirectional vehicle of claim 7, wherein said vehicle further comprises an inclination sensor disposed in said support post.

11. The inverted pendulum type omnidirectional vehicle of claim 9, wherein said vehicle further comprises a pair of opposed steps attached to said base for supporting a user's feet thereon.

* * * * *